United States Patent
Stokes

(10) Patent No.: US 7,816,459 B2
(45) Date of Patent: Oct. 19, 2010

(54) METHOD FOR PREPARING POLYOLEFINS CONTAINING VINYLIDINE END GROUPS USING POLYMERIC NITROGEN COMPOUNDS

(75) Inventor: Casey D. Stokes, Novato, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 1095 days.

(21) Appl. No.: 11/356,490

(22) Filed: Feb. 16, 2006

(65) Prior Publication Data

US 2007/0155910 A1    Jul. 5, 2007

Related U.S. Application Data

(60) Provisional application No. 60/755,545, filed on Dec. 30, 2005.

(51) Int. Cl.
C08F 10/00    (2006.01)
(52) U.S. Cl. .............. 525/333.7; 525/334.1; 525/333.9; 525/203; 525/217; 525/375; 525/381; 526/82; 526/83; 526/84; 526/85; 526/237; 526/348
(58) Field of Classification Search .................. 525/203, 525/206, 333.1, 348, 349, 351, 375, 540
See application file for complete search history.

(56) References Cited

U.S. PATENT DOCUMENTS

| | | | |
|---|---|---|---|
| 3,155,686 A | 11/1964 | Prill et al. | |
| 3,632,600 A | 1/1972 | Morris et al. | |
| 4,034,038 A | 7/1977 | Vogel | |
| 4,152,499 A | 5/1979 | Boerzel et al. | |
| 4,238,628 A | 12/1980 | Cahill et al. | |
| 4,255,538 A | 3/1981 | Skillcorn | |
| 4,276,394 A | 6/1981 | Kennedy et al. | |
| 4,342,849 A | 8/1982 | Kennedy | |
| 4,393,199 A | 7/1983 | Manser | |
| 4,468,291 A | 8/1984 | Naarmann et al. | |
| 4,486,572 A | 12/1984 | Kennedy | |
| 4,568,732 A | 2/1986 | Kennedy et al. | |
| 4,758,631 A | 7/1988 | Kennedy et al. | |
| 4,814,405 A | 3/1989 | Kennedy | |
| 4,910,321 A | 3/1990 | Kennedy et al. | |
| 4,929,683 A | 5/1990 | Kennedy et al. | |
| 4,943,616 A | 7/1990 | Mishra et al. | |
| 4,946,899 A | 8/1990 | Kennedy et al. | |
| 4,948,936 A | 8/1990 | Landry | |
| 5,032,653 A | 7/1991 | Cheradame et al. | |
| 5,066,730 A | 11/1991 | Kennedy et al. | |
| 5,112,507 A | 5/1992 | Harrison | |
| 5,122,572 A | 6/1992 | Kennedy et al. | |
| 5,169,914 A | 12/1992 | Kaszas et al. | |
| 5,175,225 A | 12/1992 | Ruhe, Jr. | |
| 5,219,948 A | 6/1993 | Storey et al. | |
| 5,225,492 A | 7/1993 | Kennedy et al. | |
| 5,286,823 A | 2/1994 | Rath | |
| 5,300,701 A | 4/1994 | Cherpeck | |
| 5,334,321 A | 8/1994 | Harrison et al. | |
| 5,336,745 A | 8/1994 | Cheradame et al. | |
| 5,340,881 A | 8/1994 | Kennedy et al. | |
| 5,350,819 A | 9/1994 | Shaffer | |
| 5,366,745 A | 11/1994 | Daden | |
| 5,395,885 A | 3/1995 | Kennedy et al. | |
| 5,428,111 A | 6/1995 | Faust et al. | |
| 5,444,135 A | 8/1995 | Cheradame et al. | |
| 5,448,000 A | 9/1995 | Gullapalli et al. | |
| 5,451,647 A * | 9/1995 | Faust et al. ................. | 526/147 |
| 5,464,549 A | 11/1995 | Sieberth | |
| 5,488,000 A | 1/1996 | Zhang et al. | |
| 5,506,316 A | 4/1996 | Shaffer | |
| 5,580,935 A | 12/1996 | Shaffer | |
| 5,616,668 A | 4/1997 | Harrison et al. | |
| 5,629,394 A | 5/1997 | Cheradame et al. | |
| 5,637,647 A | 6/1997 | Faust | |
| 5,663,457 A | 9/1997 | Kolp | |
| 5,663,470 A | 9/1997 | Chen et al. | |
| 5,677,386 A | 10/1997 | Faust | |
| 5,690,861 A | 11/1997 | Faust | |
| 5,777,044 A | 7/1998 | Faust | |
| 5,945,491 A | 8/1999 | Matyjaszewski et al. | |
| 5,948,936 A | 9/1999 | Itoh et al. | |
| 6,033,446 A | 3/2000 | Cherpeck et al. | |
| 6,194,597 B1 | 2/2001 | Faust et al. | |
| 6,407,066 B1 | 6/2002 | Dressen et al. | |
| 6,451,920 B1 | 9/2002 | Harrison et al. | |

(Continued)

FOREIGN PATENT DOCUMENTS

DE        237072        7/1986

(Continued)

OTHER PUBLICATIONS

Wallace et al., Intelligent Polymer Systems, Encyclopedia of Polymer Science and Technology, pp. 231-250, Jul. 2004.*

(Continued)

*Primary Examiner*—James Seidleck
*Assistant Examiner*—Robert C Boyle

(57) ABSTRACT

Disclosed is a method for preparing polyolefins containing vinylidine end groups from quasiliving carbocationically terminated polyolefin polymers by contacting the quasiliving carbocationically terminated polymer with quenching agent selected from the group consisting of polypyrrole, polyvinylpyridine, polyphenothiazine, polyoxazine, and polypyrrole-co-thiophene and substituted derivatives thereof.

32 Claims, No Drawings

U.S. PATENT DOCUMENTS

| | | |
|---|---|---|
| 6,468,948 B1 | 10/2002 | Rossi et al. |
| 6,515,083 B2 | 2/2003 | Ozawa et al. |
| 6,642,318 B1 | 11/2003 | Chiefari et al. |
| 6,753,391 B1 | 6/2004 | Lewandowski et al. |
| 6,818,716 B2 | 11/2004 | Wendland et al. |
| 6,906,011 B2 | 6/2005 | Harrison et al. |
| 6,969,744 B2 | 11/2005 | Stokes et al. |
| 7,071,275 B2 | 7/2006 | Rath et al. |
| 7,124,110 B1 | 10/2006 | Kemp, II et al. |
| 7,244,870 B2 | 7/2007 | Lange et al. |
| 7,420,019 B2 | 9/2008 | Stokes |
| 7,501,476 B2 | 3/2009 | Stokes |
| 7,576,161 B2 | 8/2009 | Stokes |
| 7,705,090 B2 | 4/2010 | Stokes |
| 7,709,580 B2 | 5/2010 | Stokes |
| 2002/0082367 A1* | 6/2002 | McConville et al. ......... 526/119 |
| 2002/0132905 A1* | 9/2002 | Babinee et al. ............. 524/495 |
| 2003/0105194 A1 | 6/2003 | Stuart et al. |
| 2003/0162858 A1* | 8/2003 | Faust et al. .................... 522/31 |
| 2003/0191257 A1* | 10/2003 | Wettling et al. ............. 526/237 |
| 2004/0015029 A1 | 1/2004 | Lange et al. |
| 2004/0260033 A1* | 12/2004 | Stokes et al. ................ 525/375 |
| 2005/0282972 A1 | 12/2005 | Stokes et al. |
| 2006/0041081 A1 | 2/2006 | Stokes et al. |
| 2006/0041083 A1 | 2/2006 | Stokes et al. |
| 2006/0041084 A1 | 2/2006 | Stokes et al. |
| 2006/0135721 A1 | 6/2006 | Lange et al. |
| 2006/0264577 A1 | 11/2006 | Faust et al. |
| 2007/0155908 A1 | 7/2007 | Stokes et al. |
| 2007/0155910 A1 | 7/2007 | Stokes |
| 2007/0155911 A1 | 7/2007 | Stokes et al. |
| 2009/0138624 A1 | 5/2009 | Isaac et al. |
| 2009/0247716 A1 | 10/2009 | Stokes et al. |
| 2009/0258803 A1 | 10/2009 | Harrison et al. |

FOREIGN PATENT DOCUMENTS

| | | |
|---|---|---|
| DE | 240308 | 10/1986 |
| DE | 253827 | 2/1988 |
| DE | 262028 | 11/1988 |
| DE | 262233 | 11/1988 |
| DE | 266104 | 3/1989 |
| DE | 282697 | 9/1990 |
| DE | 296283 | 11/1991 |
| DE | 296284 | 11/1991 |
| DE | 296285 | 11/1991 |
| DE | 296286 | 11/1991 |
| EP | 02/06756 | 6/1986 |
| EP | 206756 A2 | 12/1986 |
| EP | 255181 A1 | 2/1988 |
| EP | 342792 A1 | 11/1989 |
| EP | 397081 A2 | 5/1990 |
| EP | 400844 A1 | 5/1990 |
| EP | 0 341 012 B1 | 12/1992 |
| EP | 959096 A1 | 11/1999 |
| EP | 1209170 A1 | 5/2002 |
| EP | 1489109 A2 | 12/2004 |
| GB | 1 159 368 | 4/1987 |
| GB | 2 184 738 A | 7/1987 |
| JP | 03287605 | 12/1991 |
| JP | 5-186513 | 7/1993 |
| JP | 2001172567 A | 6/2001 |
| WO | WO 90/05711 | 5/1990 |
| WO | 94/13706 | 6/1994 |
| WO | 97/19962 A1 | 6/1997 |
| WO | WO 99/09074 | 2/1999 |
| WO | 03/106390 A1 | 12/2003 |
| WO | 2004/048215 A2 | 6/2004 |
| WO | 2006/110647 A1 | 10/2006 |

OTHER PUBLICATIONS

Hamley, Bock Copolymers, Encyclopedia of Polymer Science and Technology, pp. 457-482, Mar. 2002.*

Diaz et al., Electrochemical Polymerization of Pyrrole, J. Chem. Soc. Chem. Commun., 1979, pp. 635-636, Royal Society of Chemistry.

Diaz et al., A Polymer Electrode with Variable Conductivity: Polypyrrole, J. Chem. Soc. Chem. Commun., 1980, pp. 397-398, Royal Society of Chemistry.

Zinger et al., Timed Release of Chemicals from Polypyrrole Films, J. American Chemical Society, 1984, pp. 6861-6863, vol. 106, No. 22, American Chemical Society.

Roth et al., A Novel Method for the Determination of Propagation Rate Constants: Carbocationic Oligomerization of Isobutylene, Macromolecules, 1996, pp. 6104-6109, vol. 29, No. 19, J. American Chemical Society.

Bae et al., β-Proton Elimination by Free Bases in the Living Carbocationic Polymerization of Isobutylene, Macromolecules, 1997, pp. 7341-7344, vol. 30, No. 23, J. American Chemical Society.

Nielsen et al., Synthesis of isobutenyl-telechelic polyisobutylene by functionalization with isobutenyltrimethylsilane, Polymer, 1997, pp. 2529-2534, vol. 38, No. 10, Elsevier Science Ltd.

Gardini, The Oxidation of Monocyclic Pyrroles, Adv. Heterocyl. Chem., 1973, pp. 67-99, vol. 15, No. 67.

Office Action mailed Dec. 5, 2008, U.S. Appl. No. 11/357,562.

Notice of Allowance mailed Dec. 3, 2008, U.S. Appl. No. 11/356,491.

Office Action mailed May 13, 2008, U.S. Appl. No. 11/356,491.

Office Action mailed Feb. 20, 2009, U.S. Appl. No. 11/186,157.

Office Action mailed Oct. 20, 2008, U.S. Appl. No. 11/186,157.

Office Action mailed Apr. 1, 2008, U.S. Appl. No. 11/186,157.

Notice of Allowance mailed Aug. 11, 2005, U.S. Appl. No. 10/600,898.

Bae et al., "The Role of Pyridine Derivatives in Living Carbocationic Polymerization: Lewis Base or Nucleophile", Macromol, Symp. vol. 132, 11-23, 1998.

Bauer et al., "Complexes of stannic chloride and alkyl phenols and the influence of these complexes and of free phenol on the cationic polymerization of isobutene", Can. J. Chem., 48, 1251, 1970.

Bauer et al., "Cationic polymerication of isobutene initiated by stannic chloride and phenols: polymer endgroup studies", J. Poly. Sci., A-1(9), 1451, 1971.

Bezumnova et al., "Reaction of 2-mercaptobenzothiazole with ethylenic hydrocarbons" (English abstract), Khim. Geterosikl. Soedin. 80, 194, 1971.

Boileau et al., "Reaction of functionalised thiols with oligoisobutenes via free-radical addition. Some new routes to thermoplastic crosslinkable polymers", European Polymer Journal, 39, 1395-1404, 2003.

Database WPI Section Ch. Week 197201 Derwent Publications Ltd. London, GB; Class E13, AN 1972-00713T XP002316480—& SU 293 804 A (ND Zelinskii organic chem) Jan. 26, 1971 abstract.

De et al., "Carbocationic polymerization of isobutylene using methylaluminum bromide coinitiators: synthesis of bromoallyl functional polyisobutylene", Macromolecules, 39(22), 7527, 2006.

De et al., "Relative Reactivity of C4 olefins toward the polyisobutylene cation", Macromolecules, 39, 6861, 2006.

De et al., "Capping reactions in cationic polymerization: kinetic and synthetic utility", ACS Div. Polym. Chem., Polym. Preprs., 46, 847, 2005.

Faust et al., "Living Carbocationic Polymerization. XXI. Kinetic and mechanistic studies of isobutylene polymerization initiated by trimethylpentyl esters of different acids", J. Macromol. Sci.—Chem., A27(6), 649-667, 1990.

Gonzales de la Campa, J., Pham, Q. Makromol. Chem., 182, 1415, 1981 (English Abstract).

Gorski et al., "Functionalized polyisobutenes by SH-en addition", Die Angewandte Makromolekulare Chemie, 253, 51-64, 1997.

Hadjikyriacou et al., "Cationic Macromolecular Design and Synthesis Using Furan Derivatives", Macromolecules, 32, 6394-6399, 1999.

Hadjikyriacou et al., "Living Coupling Reaction in living cationic polymerization. 3. Coupling reaction of living polyisobutylene using bis(furanyl) derivatives", Macromolecules, 33, 730-733, 2000.

Higashihara et al., "Synthesis of Poly(isobutylene-block-methyl methzcrylate) by a novel coupling approach", Macromolecules, 39(16), 5275, 2006.

Ipatieff et al., "Reaction of Aliphatic Olefins with Thiophenol", J. Am. Chem. Soc. 60, 2731, 1938.

Kaszas et al., "Living carbocationic polymerization. Isobutylene polymerization in the presence of pyridine and various other electron donors", Polymer Bulletin (Berlin), 20(5), 413-19, 1988.

Kennedy et al., "New Telechelic Polymers and Sequential Copolymers by Polyfunctional Initiator Transfer Agents (Inifers) V. Synthesis of a-tert-butyl-w-isopropenylopolyisobutylene and a,w-Di(isopropenyl)polyisobutylene", Polymer Bulletin, 1, 575-580, 1979.

Kennedy et al., "New Telechelic polymers and sequential Copolymers by Polyfunctional Initiator Transfer Agents (Inifers) 27 bisphenol and trisphenol polyisobutylenes", Poly. Bull., 8, 563-570, 1982.

Kennedy, J.P.; Hayashi, A. Journal of Macromolecular Science, Chemistry, A28(2), 197-207, 1991.

Kim et al., "Synthesis and Characterization of Novel Silicon-Functional Polyisobutylenes and Their Applications: Polyisobutylene Brushes on Silicate Substrates via Living Cationic Polymerization", Journal of Macromlecular Science Part A—Pure and Applied Chemistry. A40(10), 991-1008, 2003.

Klemm et al., "Untersuchungen zur Thioladdition an Polybutadiene", Angew Makromol. Chem., 207, 187, 1993 (English Abstract).

Klemm et al., "Unusual addition by the thiol-ene photopolymerization", Polym. Bull. (Berlin) 28, 653, 1992.

Koroskenyl et al., "Initiation via haloboration in living cationic polymerization. 6. A novel Method for the synthesis of primary amine functional polyisobutylenes", Pure Appl. Chem., A36(12), 1879-1893, 1999.

Lenz, "Organic Chemistry of Synthetic High Polymers," Section 7.2 Poly(alkylene Sulfides), Interscience Publishers, New York, p. 196, 1967.

Li et al., "Polyisobutylene supports—a non-polar hydrocarbon analog of PEG supports", Tetrahedron, 61, 12081-12092, 2005.

Maenz et al., "Investigation of the structure of low molecular weight polybutadienes and epoxides made therefrom", Acta Polymerica, 47(5), 208-213, 1996.

Maenz et al., "Macromonomers based on low-molecular-weight polyisobutenes", Angewandte Makromolekulare Chemie, 242, 183-197, 1996.

Maenz et al., "Comb-like polymers from macromonomers based on low-molecular weight poly(isobutene)s", Angewandte Makromolekulare Chemie, 258, 69-73, 1998.

Martinez-Castro et al., "Polyisobutylene Stars and Polyisobutylene-block-poly(tert-butyl methacrylate) block copolymers by site transformation of thiophene end-capped polyisobutylene chain ends", Macromolecules, 36, 6985-6994, 2003.

Mishra et al., "New telechelic polymers and sequential copolymers by polyfunctional initiator transfer agents (inifers) LI. Synthesis and characterization of anisole terminated polyisobutylenes", Poly. Bull., 16, 47-53, 1982.

Morgan et al., "Thiol/Ene Photocurable Polymers", J. Polym. Sci. Polym. Chem. Ed., 15, 627, 1977.

Nuyken et al., "Novel sulfur containing polymers", Makromol. Chem. Macromol. Symp, 26, 313, 1989.

Nuyken et al., "Telechelics via addition of dithiols onto alkadienes, 1 Radical mechanism", Makromol. Chem. Rapid Commun. 11, 365, 1990.

Nuyken, O; Chang, V. S. C.; Kennedy, J. P. Polym. Bull. (Berlin), 4, 61-65, 1981.

Puskas et al., "The Nature of the Double Bond in Low Molecular Weight Polyisobutylenes and Polybutene Copolymers", J. Polymer Sci: Symposium No. 56, 191, 1976.

Rooney, "Synthesis of Phenol-Terminated Polyisobuylene: competitive chain transfer reactions", J. Appl. Poly. Sci. , 25, 1365-1372, 1980.

Schriescheim et al., "Industrial Friedel-Crafts chemistry: Past and future", Chemtech, 310, 1978.

Serniuk et al., "Study of the Reaction of Buna Rubbers of Aliphatic Mercaptans", J. Am. Chem. Soc. 70, 1804, 1948.

Si et al., "Living carbocationic polymerization. Narrow molecular weight distribution polyisobutylenes prepared by esters and ketones as electron donors", Polymer Bulletin (Berlin) 33(6), 651-6, 1994.

Simison et al., "End-Quenching of Quasiliving Carbocationic Isobutylene Polymerization with Hindered Bases: Quantitative Formation of exo-Olefin-Terminated Polyisobutylene", Macromolecules, 39, 2481-2487, 2006.

Stacey et al. Organic Reactions: vol. 13, pp. 150-208 and 233-333, 1963.

Storey et al., "N-methylpyrrole-terminated polyisobutylene through end-quenching of quasiliving carbocationic polymerization", Macromolecules, 38(11), 4618-4624, 2005.

Zhang et al., "Synthesis of Polyisobutylene with arylamino terminal group by combination of cationic polymerization with alkylation", Poly. Sci. A. Poly. Chem, 46, 936-946, 2008.

U.S. Appl. No. 12/055,281, filed Mar. 25, 2008.

Office Action mailed Jan. 2, 2008, U.S. Appl. No. 11/207,377.

Office Action mailed Mar. 23, 2007, U.S. Appl. No. 11/207,377.

Office Action mailed Nov. 12, 2008, U.S. Appl. No. 11/207,366.

Office Action mailed Nov. 12, 2008, U.S. Appl. No. 11/207,264.

DePuy et al., "Electronic Effects in Elimination Reactions, V. The E2 Reaction of b-Phenylethyl Fluorides and Chlorides", J. Am. Chem. Soc., 82(10), 2535-3537, 1960.

Evsyukov et al., "Chemical dehydrohalogenation of halogen-containing polymer", Russian Chemical Reviews, 60(4), 373-390, 1991.

Faust et al., "Living Carbocationic Polymerization. IV. Living Polymerization of Isobutylene", J. Polym. Sci. A Polym. Chem. 25, 1847-1864, 1986.

Fodor et at., "Synthetic Applications of Non-Polymerizable Monomers in Living Carbocationic Polymerizations", ACS Div. Polym. Chem., Polym. Preprs., 35(2), 492-493, 1994.

Hadjikyriacou, et al., "Living Coupling Reaction in Living Cationic Polymerization. 4. Synthesis of Telechelic Polyisobutylenes Using Bis-Furanyl Derivatives as Coupling Agents", JMS PureApplChem, A37, 1333-52, 2000.

Ivan et al., "Living carbocationic polymerization. XXX. One-pot synthesis of allyl-terminated linwar and tri-arm star polyisobutylenes, and epoxy-and hydroxy-telechelics therefrom", J. Polym. Sci.: Part A: Polym. Chem., 28, 89-104, 1990.

Ivan et al., "New telechelic polymers and sequential copolymers by polyfunctional initiator-transfer agents (inifers)", J. Poly. Chem. Ed., 18, 3177-3191, 1980.

Kaszas et al., "Electron Pair Donors in Carbocationic Polymerization. 2. Mechanism of Living Carbocationic Polymerizations and the Role of in Situ and External Electron Pair Donors", Macromolecules 23, 3909-3915, 1990.

Keki et al., "Dimethyldioxirane as a New and Effective Oxidation Agent for the Epoxidation of a,w-Di(isobutenyl)polyisobutylene: A convenient Synthesis of a,w-Di(2-methy1-3- hydroxypropyl)-polyisobutylene", J. Poly. Sci. A Poly. Chem., 40(22), 3974-3986, 2002.

Kennedy et al., "New Telechelic Polymers and Sequential Copolymers by Polyfunctional Initiator-Transfer Agents, I.", Polym. Prepr. (Am. Chem. Soc., Div. Polym. Chem.) 20(2), 316, 1979.

Kennedy et al., "New Telechelic Polymers and Sequential Copolymers By Polyfunctional Initiator-Transfer Agents, II.", J. Polym. Sci., Polym. Chem. Ed., 18, 1523, 1980.

Kennedy et al., "New Telechelic Polymers and Sequential Copolymers by Polyfunctional Initiator-Transfer Agents, (Inifers) 10. Three-Arm Star Telechelic Polyisobutylenes Carrying Chlorine, Olefin or Primary Alcohol Endgroups", Polym. Bull. 4, 67-74, 1981.

Kennedy et al., "New Telechelic Polymers and Sequential Copolymers by Polyfunctional Initiator-Transfer Agents (Inifers)", Polym. Bull., 9, 27-32, 1983.

Machl et al., "Novel Synthetic Routes to Aminofunctionalized Polyisobutylenes", ACS Div. Polym. Chem. Polym. Preprs., 44(2), 858-859, 2003.

Mishra et al., "Living Carbocationic Polymerization, VIII.", J. P. Polym. Bull. 17, 7-13, 1987.

Nemes et al. "Oxyethylation and Carbonation of Telechelic Polyisobutylene Anions", Poly. Bull. 24, 187-194, 1990.

Odian, Principles of Polymerization, 4th ed., Wiley, Chapter 8.

Pernecker et al., "Living Carbocationic Polymerization, XLVI. Living isobutylene polymerization induced by the common ion effect", Polym. Bull. 26, 305-312, 1991.

Puskas et al., "Investigation of the Effect of Epoxide Structure on the Initiation Efficiency in Isobutylene Polymerizations Initiated by Epoxide/TiCl$_4$ Systems", Euro. Polymer Journal 39: 2147-2153, 2003.

Sawamoto et al., "End Functionalized Polymers by Living Cationic Polymerization", Macromolecules, 20(1), 1-6, 1987.

Sita et al., "Amidinate-based catalysts for stereoselective living ziegler-natta polymerizations", Abstracts of Papers of the American Chemical Society, vol. 224, Part 2, pp. U502-U502, 2002.

Storey et al., "Mechanistic Role of Lewis Bases and Other Additives in Quasiliving Carbocationic Polymerization of Isobutylene", Macromolecules 34, 5416-5432, 2001.

Ummadisetty et al., "Rapid Communication: Quantitative Syntheses of Novel Polyisobutylenes Fitted with Terminal Primary —Br, -Oh, -NH2, and Methacrylate Termini", J. Poly. Sci. A Poly. Chem., 46, 4236-4242, 2008.

Wollyung et al., "Synthesis and Mass Spectrometry Characterization of Centrally and Terminally Amine-Functionalized Polyisobutylenes", J. Poly. Sci. A Poly. Chem., 43(5), 946958, 2005.

Notice of Allowance mailed Aug. 6, 2009, U.S. Appl. No. 11/207,264.

Notice of Allowance mailed Dec. 10, 2009, U.S. Appl. No. 11/207,264.

Notice of Allowance mailed Aug. 7, 2009, U.S. Appl. No. 11/207,366.

Notice of Allowance mailed Dec. 15, 2009, U.S. Appl. No. 11/207,366.

Supplemental Notice of Allowance mailed Apr. 2, 2010, U.S. Appl. No. 11/207,366.

Office Action mailed Aug. 7, 2009, U.S. Appl. No. 11/357,562.

Final Office Action mailed Apr. 2, 2010, U.S. Appl. No. 11/357,562.

Office Action mailed Jun. 11, 2010, U.S. Appl. No. 12/055,281.

* cited by examiner

METHOD FOR PREPARING POLYOLEFINS CONTAINING VINYLIDINE END GROUPS USING POLYMERIC NITROGEN COMPOUNDS

FIELD OF THE INVENTION

The present invention is directed to a method for preparing polyolefins containing vinylidine end groups. More particularly, the present invention is directed to preparing polyolefins containing vinylidine end groups from quasiliving carbocationically terminated polyolefin polymers by contacting the quasiliving carbocationically terminated polymer with a quenching agent selected from the group consisting of polypyrrole, poly(2-vinylpyridine), polyphenothiazine, polyoxazine, and polypyrrole-co-thiophene and substituted derivatives thereof.

BACKGROUND OF THE INVENTION

Linear polyolefins made using a mono-functional initiator containing a single "exo-olefin", "1,1-di-substituted" olefin, or "methylvinylidene," end group are useful precursors for the preparation of polymers containing specific functional end groups. Polymers made using multi-functional initiators would have multiple exo-olefinic end groups. Polymers containing specific end groups are useful as lubricating oil additives. One example of a functionalized polymer containing hetero atoms is polyisobutenylsuccinic anhydride, which is produced by reaction of olefin terminated polyisobutylene with maleic anhydride. Functional end groups may also be desirable for synthesizing polymers capable of undergoing further reaction.

Conventional ionic polymerizations can be anionic or cationic. Anionic polymerizations proceed, in the presence of a base, through carbanions and favor monomers having electron withdrawing groups. Cationic polymerizations proceed, in the presence of an acid, through a carbocation, also called a carbenium ion, and favor monomers that have electron releasing groups.

Similarly to the conventional polymerization systems, living polymerization systems may be either anionic or cationic. The difference between conventional polymerizations and living polymerizations is that an ideal living polymerization proceeds in the absence of chain transfer and chain termination. Living polymerization systems are of great commercial importance because the degree of polymerization may be controlled by controlling the feed ratio of monomer to initiator and sequential addition of two or more different monomers affords the ability to produce block copolymers. Polymerization continues until the monomer is exhausted, but the polymers retain their ability to add additional monomers any time in the future. A number of such systems are well known in the art.

A further development is the cationic quasi-living polymerization systems using conventional monomers. Quasi-living polymerization is best achieved when certain conditions are employed, for example anhydrous reagents. Cationic quasi-living polymerizations differ from truly living polymerizations in that, although the rate of chain transfer approaches zero, chain termination is present but reversible. One important example of a cationic quasi-living polymerization is the cationic quasi-living polymerization of isobutylene.

Typically, cationic quasi-living polymerizations of isobutylene yield narrow molecular weight distribution and one major polymer product containing the 2-chloro-2-methylpropyl end group, also referred to as the "tert-chloride" end group. Under certain conditions minor amounts of olefinic isomers may also be produced. On the other hand, there are two major olefinic isomers produced during conventional polymerization of isobutylene with $BF_3$. The highly reactive exo-olefin isomer is the most abundant and the relatively unreactive 2-methyl-1-propenyl isomer is also produced. The 2-methyl-1-propenyl isomer is also referred to as the "tri-substituted" isomer or "endo olefin" isomer. Furthermore, conventional polymerization of isobutylene yield polymers with broader molecular weight distributions or polydispersity indices than typical quasiliving polymerizations.

Exclusive production of the exo-olefin isomer has not been previously achieved under conventional polymerization conditions.

There are two established methods for producing polyisobutylene containing only the exo-olefin end group. One method involves chemical dehydrohalogenation of tert-chloride terminated polyisobutylene using potassium tert-butoxide in a post polymerization reaction (U.S. Pat. No. 4,342,849). The other method involves in situ quenching of quasiliving isobutylene with methallyltrimethylsilane, which converts an active, living carbenium ion to the exo-olefin end group. See for example, Roth and H. Mayr, *Macromolecules*, 29, 6104, 1996; and Nielsen, L. V.; Nielsen, R. R.; Gao, B.; Kops, J.; Ivan, B. *Polymer* 1997, 38(10), 2529.

Polyisobutylene polymers containing more than one exo-olefin end group may be prepared using the above methods by the use of a multi-functional initiator. The preparation of polyolefins, including polyisobutylene polymers, is well known in the art. A number of patents have discussed processes for making polyisobutylene polymers containing exo-olefin end groups, but none using quenching a cationic quasi-living polymerization system with the saturated heterocyclic ring compounds of the present invention.

SUMMARY

The present invention is directed in part to a method for preparing polyolefins containing vinylidene end groups; this method involves providing a) a quasiliving carbocationically terminated polyolefin polymer, and contacting the polymer in step a) with at least one quenching agent selected from the group consisting of polypyrrole, poly(2-vinylpyridine), polyphenothiazine, polyoxazine, poly(pyrrole-co-thiophene), poly(pyrrole-co-furan), and substituted derivatives thereof. The contacting step is conducted under suitable conditions to enable the quenching agent to interact with the reactive chain end of the polyolefin and facilitate the removal of a proton from the reactive chain end, thereby forming the vinylidene end group.

The quasiliving carbocationically terminated polymer can be formed by contacting at least one cationically polymerizable olefin monomer with an initiator, in the presence of a Lewis acid and solvent under suitable quasiliving polymerization reaction conditions and thereafter adding the quenching agent. This type of reaction allows for in-situ formation of the final vinylidene containing polyolefin. Other suitable quasiliving carbocationically terminated polyolefin polymers can be formed by ionizing a polyolefin chain end, commonly halides, in the presence of a Lewis acid and a solvent under suitable quasiliving polymerization reaction conditions.

The initiators may be monofuncitonal, bifunctional or multifunctional and various olefin monomers can be employed.

In one embodiment, the quenching agent is a polymer selected from the group consisting of polypyrroles, polyvinylpyridines, polyphenothiazines, polyphenoxazine, polyimidazoles poly(pyrrole-co-thiophene), poly(pyrrole-co-furan) and substituted derivatives thereof. Additionally, mixtures of the polymers or mixtures of the substituted derivatives thereof can be employed. As known in the art, these polymers may be substituted such as poly(substituted pyrroles) or copolymers including block polymers, diblock polymers, etc. Substitution can ease in the handling, solubility, reaction kinetics, and thus can be optimized depending upon the ultimate result. Preferably the quenching agent is selected from the group consisting of polypyrrole, polyvinylpyridine, polypyrrole-thiophene and polypyrrole-furan, more preferably polypyrrole, polypyrrole-thiophene and polypyrrole-furan, and even more preferably polypyrrole and substituted polypyrrole. In another aspect, copolymers of the above.

In one aspect, the quenching agent can be employed in a heterogenous phase from the quasiliving carbocationically terminated polyolefin polymer. Thus, the quenching agent can be contacted with the quasiliving carbocationically terminated polyolefin polymer as a dispersion or for example in a fixed media. This enables the quenching agent to be easily separated from the final polymer. Likewise, this aspect can be capitalized when the quasiliving polymer is contacted with the quenching agent. For example, this contacting can be performed in a fixed bed reactor or in a fluidized bed reactor or other suitable heterogeneous type reactor.

In another aspect, the quasiliving polymerization system is so controlled so that the vinylidene terminated polymer has a molecular weight distribution, $M_w/M_n$, from about 1.01 to about 3.0, more preferably from about 1.1 to about 2.0 and even more preferably less than 1.5.

DETAILED DESCRIPTION

Definitions

As used herein, the following terms have the following meanings unless expressly stated to the contrary:

The term "alkyl" as used herein refers to straight chain and branched chain saturated aliphatic groups typically having from one carbon atom to about 20 carbons atoms. Some examples of straight chain and branched chain saturated aliphatic groups are methyl, ethyl, propyl, butyl, isopropyl, isobutyl, sec-butyl, tert-butyl, and the like. The term "branched alkyl" as used herein refers to an alkyl group in which the carbon atom representing the point of attachment of the group to the rest of the molecule is either a tertiary or quaternary carbon atom. The term "tertiary carbon" as used herein refers to a carbon atom that is attached to three other carbon atoms. The term "quaternary carbon" as used herein refers to a carbon atom that is attached to 4 other carbon atoms.

The terms "carbenium ion" or "carbocation" as used herein refer to a positively charged carbon atom bearing three $sp^2$-bonded substituents and an empty p orbital.

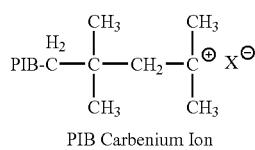

PIB Carbenium Ion

The term "chain transfer" as used herein refers to the cessation of growth of one polymerization chain with the possible initiation of another polymerization chain.

The term "common ion salt" as used herein refers to an ionic salt that is optionally added to a quasi-living cationic polymerization mixture to prevent dissociation of the propagating carbenium ion and counter-ion pairs. The anion of the common ion salt is identical to the counter-ions of the propagating chain ends. The cation of the common ion salt is typically a fatty quaternary ammonium cation, such as tetra-n-butyl ammonium ion, which confers solubility in the organic media.

The term "common ion salt precursor" as used herein refers to an ionic salt, optionally added to a quasi-living cationic polymerization mixture, which generates counter-anions that are identical to those of the propagating chain ends, via in situ reaction with the Lewis acid. An example is tetra-n-butylammonium chloride.

The term "controlled molecular weight distribution" as used herein refers to polyolefin polymers having a desired molecular weight distribution. The molecular weight distribution or polydispersity index (PDI) herein is calculated by dividing the average molecular weight of the polymer chains by the number average molecular weight, $M_w/M_n$.

The term "coupling" as used herein refers to the addition of a polymer terminal carbenium to a polymer exo-olefin chain end, for example when the polymer is polyisobutylene then this refers to the addition of a polyisobutylene terminal carbenium ion to a polyisobutylene olefin chain end.

The term "coupled product" as used herein refers to the product of addition of a polymer (terminal carbenium) ion to a polymer (exo-olefin) chain end. Coupled product has a number average molecular weight that is approximately twice that of the main polymer product.

The term "conventional polymerization" as used herein refers to polymerization wherein the chain-reaction polymerization involving olefins proceeds with ions as chain carrying particles, either anions or cations. Polymerization proceeds through the steps of chain initiation, chain propogation, chain transfer and chain termination.

The term "di-EAS product" as used herein refers to the product which results when two separate polymer terminal carbenium ions react to form a covalent bond with a single quenching agent molecule. Di-EAS product contains in its structure a residue from the quenching agent.

The term "vinylidene" refers to a polymer chain end with the following generic structure:

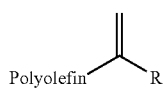

where R can be H, alkyl, aryl, aralkyl, or alkaryl.

The terms "di-substituted olefin" or "exo-olefin" or "methyl vinylidene" as used herein refer to an olefin polymer chain containing an exo-olefin chain end, for polyisobutylene the structure is as shown below.

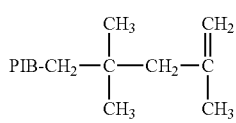

The term "EAS product" as used herein refers to the product which results when one polymer terminal carbenium ion reacts to form a covalent bond with a single quenching agent molecule. EAS product contains in its structure a residue from the quenching agent.

The term "electron donor" as used herein refers to a basic and/or nucleophilic substance added to the polymerization reaction that is either fully complexed with the Lewis acid or fully non-complexed with the Lewis acid. The concentration of electron donor exceeds the concentration of the protic impurities, for example water.

The term "electrophilic aromatic substitution or EAS" as used herein refers to the process by which the EAS product is produced.

The term "gem-dimethyl carbons" as used herein refers to the two methyl carbons alpha to the carbenium ion or the chloride bonded carbon of the polyolefin polymer chain end as depicted in the structure below.

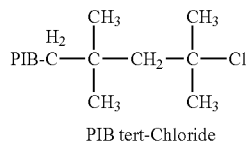

PIB tert-Chloride

The term "hydrocarbyl" refers to an organic radical primarily composed of carbon and hydrogen which may be aliphatic, alicyclic, aromatic or combinations thereof, e.g., aralkyl or alkaryl. Such hydrocarbyl groups may also contain aliphatic unsaturation, i.e., olefinic or acetylenic unsaturation, and may contain minor amounts of heteroatoms, such as oxygen or nitrogen, or halogens, such as chlorine.

The term "initiator" as used herein refers to the chemical moiety that starts the polymerization and satisfies the valence at the head of the polymer chain, or the molecule that provides that moiety. When a mono-functional initiator is used, the chain end (CE) concentration equals the initiator concentration. For a multi-functional initiator, when the functionality of the initiator equals x, then the chain end concentration equals x times initiator concentration.

The term "Lewis acid" as used herein refers to a compound that can accept a pair of electrons to form a covalent bond.

The term "living polymerization" as used herein refers to the polymerizations that proceed in the absence of measurable chain transfer and chain termination.

The term "quasi-living polymerization" as used herein refers to living polymerizations wherein reversible chain terminations is operable, but irreversible chain termination and chain transfer approaches zero.

The term "quenching agent" as used herein refers to a chemical compound which is added to a polymerization reaction to react with the polymer chain end in the presence of an active Lewis acid. The quenching agent facilitates the removal of a proton from the reactive chain end.

The term "polyolefin" as used herein refers to a polymer produced by the addition polymerization of one or more olefins, such as ethylene, propylene, styrene, isobutylene, etc.

The term "protic impurity" as used herein refers to impurities within the polymerization reaction mixture that contain acidic hydrogen atoms in their structure, for example, water.

The term "regiospecific" as used herein refers to chemical reactions that give exclusively or nearly exclusively one of several possible isomeric products.

The term "termination" as used herein refers to the chemical reaction that terminates polymerization process or the quenching reaction by deactivation of the Lewis acid.

The term "terminator" as used herein refers to the chemical compound that terminates polymerization process or the quenching reaction, but may not simultaneously initiate a new polymer chain. A number of alcohols may be used as terminators. A common terminator is methyl alcohol.

The term "tert-chloride" refers to the 2-chloro-2-methyl-propyl end group on a polyolefin polymer chain.

The present invention is directed in part, to a method for producing an vinylidene terminated polymer comprising a) providing a quasiliving carbocationically terminated polyolefin polymer, and b) contacting the polymer in step a) with quenching agent selected from the group consisting of polypyrrole, polyvinylpyridine, polyphenothiazine, polyoxazine, polypyrrole-co-thiophene and substituted derivatives thereof.

The quenching agents of the present invention are capable of converting quasiliving carbocationically terminated polyolefin polymer endo-olefin chain ends and tert-chloride chain ends to the exo-olefin chain ends. Without being bound by any theory, for example, it is believed that for polyisobutylene, quenching agents of the present invention selectively catalyze the elimination of a proton from the gem-dimethyl carbon of the polyisobutylene chain end as shown below.

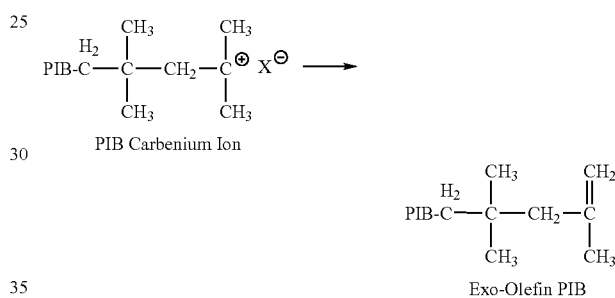

This result was unexpected since the quenching agents with very similar structures are known in the prior art to quench quasi-living cationic polymerizations by an electrophilic aromatic substitution (EAS) mechanism as disclosed in U.S. Pat. No. 6,969,744. Compounds which provide the highest EAS yields are typically substituted with electron donating groups located at strategic positions on the ring. It is believed that these substituents provide stabilization for the Friedel-Craft intermediates formed when, for example, polyisobutylene carbenium ions react with olefins in the ring.

The quenching agents used in the present invention can be employed to convert polyolefin polymer containing olefinic chain ends and tert-chloride chain ends to the exo-olefin chain ends independently of whether a mono-functional initiator is used or a multi-functional. This rate of conversion is expected to be similar for mono-functional and di-functional initiators. Temperature dependence is observed for the preparation of the polyisobutylene polymers containing a high concentration of exo-olefin chain ends based on the total chain ends. It has been determined that raising the reaction temperature increases the yield of exo-olefin by suppressing coupling. Coupling is seen as a peak centered at 4.82 just up-field from the exo-olefin peak at 4.85 parts per million peak in the $^1$H NMR spectrum and also in the GPC spectrum, represented by a low elution volume shoulder on the main peak.

In one aspect, the conditions and systems for quasi-living polymerization can be optimized in light of the quenching step. Without being bound by any theory, it is believed that the desired elimination reaction is in competition with the production of coupled product through reaction of the carbenium ion with already-formed exo-olefin. Therefore conditions that favor elimination and disfavor coupling are preferred. Higher reaction temperature has been found to favor elimination and disfavor coupling. In quasi-living cationic polymerization of isobutylene, an equilibrium exists between active, carbenium ions and dormant, tert-chloride chain ends. When the temperature of the system is raised, this equilibrium increasingly favors the dormant chain ends, but this should decrease the rates of elimination and coupling to an equal extent. However, higher temperature also should displace the equilibrium for the complex between quenching agent and Lewis acid toward un-complexed quenching agent, which is believed to be the agent that causes elimination. Raising the temperature thus provides a competitive advantage to the desired reaction. Temperature cannot be increased without limit.

Chain-end concentration and its relationship to quenching agent concentration and Lewis acid concentration are important variables. Higher chain-end concentrations, which become necessary when low molecular weights are targeted, preferentially favor olefin coupling since that process is second order in polymer chains. Therefore, to maintain the desired dominance of the rate of elimination, quenching agent concentration and/or temperature should be increased. Both of these changes, however, have the undesirable effect of reducing the concentration of carbenium ions and thus retarding the conversion of chain ends to exo-olefin. Increasing quenching agent concentration diminishes the concentration of Lewis acid possibly through the formation of a complex between quenching agent and Lewis acid, and this would diminish the carbenium ion concentration since the latter varies approximately with the square of the Lewis acid concentration. Therefore, recipes targeting low molecular weight should be formulated with higher quenching agent concentrations and higher Lewis acid concentrations and preferably run at higher temperatures. An expedient way to reduce coupling at any target molecular weight is to dilute all reactants with additional diluent.

It has been found that in the presence of sufficient concentrations of a basic electron donor, improved conversions to exo-olefin chain ends can be attained when the quenching agent concentration is but a fraction of the quasi-living chain end concentration. This suggests that under these conditions, the quenching agent may remove a proton from the carbenium ion and subsequently transfers the proton to the electron donor. That is, the quenching agent may act as a catalyst for elimination, and the electron donor may serve as a proton acceptor. The use of a less-than-stoichiometric concentration (relative to chain ends) of quenching agent could confer economic advantages in practicing the method the present invention. On the other hand, in the absence of a basic electron donor, for example, when the latter is replaced by a common ion salt or its precursor, it has been found that complete conversion of the chain ends to exo-olefin requires a stoichiometric or higher concentration of quenching agent. Under these conditions the quenching agent may serve as both catalyst and proton acceptor.

General Procedure for Preparation of Polyolefin Polymers Containing Exo-Olefin End Groups on the Chain A typical procedure for the preparation of polyolefin polymers of the present invention is given below. The method of the present invention may be conducted as a batch process, a continuous process, a semi-batch process or by any process known by persons skilled in the art. The polymerization reaction is typically carried out under inert gas and in a substantially anhydrous environment.

The reactor is charged with the following reactants:
1. a diluent,
2. an initiator,
3. an electron donor or common ion salt, or its precursor,
4. one or more monomers, and
5. a Lewis acid, which typically comprises a halide of titanium or boron;

The reaction mixture is equilibrated at the desired temperature, ranging from about −130° C. to about 10° C. The method of the present invention may be carried out at any desired pressure: atmospheric, sub-atmospheric or super-atmospheric pressure. The progress of the polymerization reaction is monitored in situ by determination of the amount of monomer remaining in the reaction mixture. After high conversion of the monomer is observed, an aliquot is removed for determination of the pre-quench chain end composition before addition of the quenching agent. The polymerization reaction in the aliquot is terminated with an appropriate alcohol equilibrated at the desired temperature.

6. One or more nitrogen-containing polymeric quenching agents is added to the reaction mixture to quench the polymerization reaction.

Although, the concentration of the reactants may be varied to obtain the desired product, it has been found that certain ratios of the reactants are preferred for obtaining high exo-olefin chain end yield. The ratios are described below:

The molar ratio of monomer to initiator is in the range from about 3:1 to about 20,000:1. Preferably the molar ratio of monomer to initiator is in the range of about 5:1 to about 2,000:1. More preferably the molar ratio of monomer to initiator is about 10:1 to 150:1. The mole ratio of monomer to initiator controls the final molecular weight of the polyolefin.

The molar ratio of Lewis acid to chain ends is in the range from about 0.1:1 to about 2,500:1. Preferably the molar ratio of Lewis acid to chain ends is in the range of about 2:1 to about 200:1. More preferably the molar ratio of Lewis acid to chain ends is about 2:1 to 15:1.

The molar ratio of Lewis acid to electron donor is in the range from about 1.1:1 to about 10,000:1. Preferably the molar ratio of Lewis acid to electron donor is in the range of about 2:1 to about 100:1. More preferably the molar ratio of Lewis acid to electron donor is about 4:1 to 30:1.

The ratio of Lewis acid to quenching agent is based upon the molar equivalent nitrogen amount in the polymeric quenching agent and is in the range from about 1.1:1 to about 150:1. Preferably the molar ratio of Lewis acid to equivalent nitrogen amount is in the range of about 2:1 to about 100:1. More preferably the molar ratio of Lewis acid to equivalent nitrogent amount is about 2:1 to 15:1.

Likewise, the ratio of quenching agent based upon the equivalent nitrogen amount in the polymeric quenching agent to chain ends is in the range from about 0.25:1 to about 20:1. Preferably the molar ratio of equivalent nitrogen amount to chain end is in the range of about 0.5:1 to about 5:1. More preferably the molar ratio of equivalent nitrogen amount to chain end is about 0.5:1 to 4:1.

Additional aliquots may be removed from the reaction mixture at various time intervals after addition of the quenching agent to determine the concentration of the exo-olefin chain ends on the polyolefin polymers. The polymerization reaction is terminated in all the aliquot samples and the remaining reaction mixture with an appropriate alcohol equilibrated at the desired temperature.

The concentration of the exo-olefin chain ends, along with the concentration of the endo-olefin and tert-chloride chain ends, is quantified using $^1$H NMR. GPC spectra are also obtained to qualitatively determine the amount of the EAS product, the di-EAS product and the coupled product.

The quasiliving polymerization and/or contacting with the quenching agent reaction(s) may be conducted batchwise or as a semicontinuous or continuous operation in which continuous streams of ingredients are delivered to the reactor; appropriate reactor systems include but are not limited to continuously stirred tank reactor systems, wherein an overflow of a slurry or solution of polymer is taken out for the recovery of the polymer therefrom, or plug flow reactors. Preferably, the reactor contents are stirred or agitated to achieve an even reactant distribution therein. Heterogeneous quenching agents can be effectively contacted with the quasiliving polymer using fixed bed and slurry reactors where the quenching agent is prepared as dispersion or in a fixed medium. The preferred mode of reaction is a batch process although theoretically a plug flow reactor may have process advantages. Typically, the reaction(s) are conducted in the liquid phase for ease of handling and to induce linear or chain type polymerization in contradistinction to ring or branch formation. If a feed is used which is gaseous under ambient conditions, it is preferred to control the reaction pressure and/or dissolve the feed in an inert solvent or liquid diluent, in order to maintain the feed in the liquid phase. For butane feeds, typical $C_4$ cuts comprising the feed are liquid under pressure and/or low temperatures and do not need a solvent or diluent. The temperature at which the reactions are carried out is important; depending upon the living or quasiliving system, too high a reaction temperature can diminish or eliminate the living character of the cationic polymerization.

Compounds suitable for use in the preparation of the polyolefin polymers of the present invention are given below:

Diluents

Diluents influence the ionization equilibrium and rates of exchange of growing species through their polarity, which can be estimated from their dielectric constants. Typically, solvents having low dielectric constants are preferred since ion pairs are less dissociated. Suitable solvents include, but are not limited to, low-boiling alkanes and alkyl mono or polyhalides with reasonably low freezing points to be used at the preferred polymerization temperature. Illustrative solvents include alkanes (generally $C_2$ to $C_{10}$ alkanes, including normal alkanes such as propane, normal butane, normal pentane, normal hexane, normal heptane, normal octane, normal nonane and normal decane, and branched alkanes including isobutane, isopentane, neopentane, isohexane, 3-methylpentane, 2,2-dimethylbutane, 2,3-dimethylbutane and the like), halogenated alkanes such as chloroform, ethylchloride, n-butyl chloride, methylene chloride, methyl chloride, 1,2-dichloroethane, 1,1,2,2-tetrachloroethane, carbon tetrachloride, 1,1-dichloroethane, n-propyl chloride, iso-propyl chloride, 1,2-dichloropropane, or 1,3-dichloropropane, alkenes and halogenated alkenes (such as vinyl chloride, 1,1-dichloroethene, and 1,2-dichloroethene), carbon disulfide, sulfur dioxide, acetic anhydride, acetonitrile, benzene, toluene, methylcyclohexane, chlorobenzene, nitro-alkanes (such as nitropropane) to name a few of the representative liquid diluents or solvents useful in cationic polymerizations. Mixed solvents (for example combinations of those listed above) can also be used.

Initiators

Initiator compounds for living and quasi-living carbocationic polymerization are well known in the art. Initiators may be mono-functional or multi-functional depending on the desired product. Mono-functional and di-functional initiators are employed when the desired polymer is to be linear. For making star polymers the initiator should have more than two reactive moieties. The contemplated initiator compounds can be represented by the general formula $(X'\text{—}CR_aR_b)_nR_c$ wherein $R_a$, $R_b$ and $R_c$ are independently comprises at least one of alkyl, aromatic, alkyl aromatic groups, and can be the same or different, and $X'$ is an acetate, etherate, hydroxyl group, or a halogen. $R_c$ has a valence of n, and n is an integer of one to 4. Preferably $R_a$, $R_b$ and $R_c$ are hydrocarbon groups containing one carbon atom to about 20 carbon atoms, preferably one carbon atom to about 8 carbon atoms. Preferably $X'$ is a halogen and more preferably chloride. In some instances it is preferable to select the structure of $R_a$, $R_b$ and $R_c$ to mimic the growing species or monomer, e.g. a 1-phenylethyl derivative for polystyrene or 2,4,4-trimethyl pentyl derivative for polyisobutylene. Suitable compounds, include for example, cumyl, dicumyl and tricumyl halides, particularly the chlorides, i.e., 2-chloro-2-phenylpropane, i.e., cumyl chloride; 1,4-di(2-chloro-2-propyl)benzene, i.e., di(cumylchloride); 1,3,5-tri(2-chloro-2-propyl)benzene, i.e., tri(cumylchloride); 2,4,4-trimethyl-2-chloropentane; 2-acetyl-2-phenylpropane, i.e., cumyl acetate; 2-propionyl-2-phenyl propane, i.e., cumyl propionate; 2-methoxy-2-phenylpropane, i.e., cumylmethyl ether; 1,4-di(2-methoxy-2-propyl)benzene, i.e., di(cumylmethyl ether); 1,3,5-tri(2-methoxy-2-propyl)benzene, i.e., tri(cumylmethyl ether), and similar compounds. Other suitable examples can be found in U.S. Pat. No. 4,946,899. Particularly preferred examples are 2-chloro-2,4,4-trimethyl pentane (TMPCl), 1,3-di(2-chloro-2-propyl)benzene, 1,3,5 tri(2-chloro-2-propyl)benzene, and 1,3,-di(2-chloro-2-propyl)-5-tert-butylbenzene (bDCC).

The concentration of the chain ends in the total reaction mixture may be in the range from about 0.0001 moles per liter to about 2.0 moles per liter. Preferably the concentration of the chain ends is in the range from about 0.001 moles per liter to about 1.0 moles per liter. More preferably the concentration of the chain ends is in the range from about 0.005 moles per liter to about 0.5 moles per liter.

Electron Donors

Electron donors have been shown to convert traditional polymerization systems into living and/or quasi-living cationic polymerizations systems. The electron donor used in the present invention is not specifically limited to any particular compound or class of compounds. Examples include pyridines and alkyl amines, aprotic amides, sulfoxides, esters, metal compounds having an oxygen atom bonded to a metal atom, and others. Pyridine compounds include 2,6-di-tert-butylpyridine, 2,6-dimethylpyridine, 2,4-dimethylpryidine, 2,4,6-trimethylpyridine, 2-methylpyridine and pyridine. N,N-dimethylaniline and N,N-dimethyltoluidine may be also employed. Amide compounds include N,N-dimethylformamide, N,N-dimethylacetamide and N,N-diethylacetamide. An example of a sulfoxide compound is dimethyl sulfoxide. Diethyl ether is an example of an ether compound, and methyl acetate and ethyl acetate are examples of ester compounds. Phosphate compounds such as trimethyl phosphate, tributyl phosphate, triamide hexamethylphosphate may also be employed. Oxygen-containing metal compounds such as tetraisopropyl titanate are also useful as electron donors.

The concentration of the electron donors in the total reaction mixture may be in the range from about 0.001 moles per liter to about 0.1 moles per liter. Preferably the concentration of the electron donors is in the range from about 0.001 moles per liter to about 0.05 moles per liter. More preferably the concentration of the electron donors is in the range from about 0.002 moles per liter to about 0.02 moles per liter.

Common Ion Salts and Common Ion Salt Precursors

Common ion salts or salt precursors may be optionally added to the reaction mixture in addition to or replacement of the electron donor. Typically, these salts are used to increase the ionic strength, suppress free ions, and beneficially interact with ligand exchange. Particularly preferred are common ion salt precursors, for example tetra-n-butylammonium chloride (n-Bu$_4$NCl). The concentration of the common ion salts or salt precursors in the total reaction mixture may be in the range from about 0.0005 moles per liter to about 0.05 moles per liter. Preferably the concentration of the common ion salts or salt precursors is in the range from about 0.0005 moles per liter to about 0.025 moles per liter. More preferably the concentration of the common ion salt or salt precursors is in the range from about 0.001 moles per liter to about 0.007 moles per liter.

Monomers

Suitable monomers for use in the method of the present invention are hydrocarbon monomers, i.e., compounds containing only hydrogen and carbon atoms, especially olefins and diolefins, and normally those having from about 2 to about 20, but preferably from about 4 to about 8 carbon atoms. The process can be employed for the polymerization of such monomers to produce polymers of different, but uniform molecular weights, for example, from about 300 to in excess of a million g/mol. Such polymers can be low molecular weight liquid or viscous polymers having a molecular weight of from about 200 to 10,000 g/mol, or solid waxy to plastic, or elastomeric materials having molecular weights of from about a 100,000 to 1,000,000 g/mol, or more. Suitable monomers include such compounds as isobutylene, styrene, beta pinene, isoprene, butadiene, substituted compounds of the preceding types, and others. Particularly preferred monomers are isobutylene, 2-methyl-butene, 3-methyl-1-butene, 4-methyl-1-pentene, and beta-pinene. An even more preferred monomer is isobutylene. Mixtures of monomers may be used. The concentration of the monomers in the total reaction mixture may be in the range from about 0.01 moles per liter to about 5.0 moles per liter. Preferably the concentration of the monomers is in the range from about 0.1 moles per liter to about 2.0 moles per liter. More preferably the concentration of the monomers is in the range from about 0.3 moles per liter to about 1.0 moles per liter. Most preferably the concentration of the monomers is 0.5 moles per liter.

Lewis Acids

Lewis acids that are suitable as catalysts for purposes of the invention include, but are not limited to, titanium and boron halides, particularly titanium tetrachloride and boron trichloride. Use of the titanium halides and particularly titanium tetrachloride is preferred. The strength of the Lewis acid and its concentration should be adjusted for the particular monomer. Additionally, the strength of these Lewis acids can be adjusted using nucleophilic additives. In some instances these Lewis acids are also referred to as co-initiators. The amount of the Lewis acid present in the initiator system may vary. However, it is desirable that the concentration of Lewis acid is sufficient to achieve an appropriate rate of polymerization and quenching. The Lewis acid concentration should not be so high as to precipitate the formed polymer. The concentration of the Lewis acid in the total reaction mixture may be in the range from about 0.001 moles per liter to about 3.0 moles per liter. Preferably the concentration of the Lewis acid is in the range from about 0.005 moles per liter to about 1.5 moles per liter. More preferably the concentration of the Lewis acid is in the range from about 0.05 moles per liter to about 1.0 mole per liter.

Quenching Agents

Quenching agents contemplated for use in preparation of the polyolefin in the present invention are described herein below. The primary characteristic shared by each quenching agent of the present invention is that they are all polymers produced by the polymerization of nitrogen-containing aromatic monomers. Coincidentally, this feature enables these polymers to perform in other applications, such as conductors and semi-conductors.

In one embodiment, the quenching agent is a polymer selected from the group consisting of polypyrroles, polyvinylpyridines, polyphenothiazines, polyphenoxazine, polyimidazoles poly(pyrrole-co-furan) and poly(pyrrole-co-thiophene) and substituted derivatives thereof. Additionally, mixtures of the polymers or mixtures of the substituted derivatives thereof can be employed. As known in the art, these polymers may be substituted such as poly(substituted pyrroles) etc. Substitution can ease in the handling, solubility, reaction kinetics, and thus can be optimized depending upon the ultimate result. In one aspect, the quenching agent can be employed in a heterogenous phase from the quasiliving carbocationically terminated polyolefin polymer.

Pyrroles are known chemical compounds having a five-member ring structure wherein four of the ring members are carbon atoms and the fifth is a nitrogen atom. It is known that the carbon atoms may include substituents such as alkyl, alkene or halogen. Polymerization of pyrrole is also known, and particularly electrochemical polymerization of pyrroles has been disclosed for instance in the J. Chem. Soc. Chem. Comm., pp 635 (1979). Polymerization of pyrrole at the anode of an electrochemical cell in the presence of a conductive salt gives films having electrical conductivity. Such resulting conductive polypyrroles may include counter-ions, particularly $BF_4^-$, $AsF_6^-$, $ClO_4^-$, and $HSO_4^-$. Typically, production of polypyrrole film-like structures is conducted by electrochemical polymerization in a conventional electrolysis cell that may optionally include a diaphragm, employing noble metal electrodes. Platinum or valve metal electrodes such as titanium are typically preferred. The resulting polypyrrole film formed by anodic oxidation is deposited on the anode and subsequently removed by stripping. Methods for continuously forming a film like structure and continuously stripping the structure from an anode have been suggested, for example, in U.S. Pat. No. 4,468,291. In J. Am. Chem. Soc. Vol. 106, pages 6861 to 6863, 1984, it is reported by Baruch Zinger and Larry L. Miller that polypyrrole is obtained by anodic oxidation in an aqueous solution by using ferrocyanide ion ($Fe(CN)_6^{4-}$) as dopant.

Polypyrroles (PPy) including polymers of substituted pyrrole and copolymers of pyrrole and other copolymerizable monomers represent one class of polymers useful in the present invention. These heterocyclic monomers form fully conjugated polymers with the potential for doped conductivity when polymerization occurs in the 2,5 positions as shown in the following scheme.

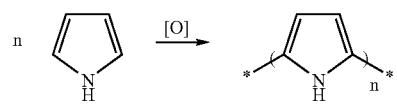

The heterocyclic monomer can be polymerized by an oxidative coupling mechanism which can be initiated by either chemical or electrochemical means. Electrochemical polymerization of pyrrole is generally believed to follow a radical step-growth mechanism where the monomer is oxidized at the anode to form radical cations, which quickly couple and eliminate two protons to re-aromatize. The pyrrole dimmer thus formed is more easily oxidized than the monomer and is re-oxidized to allow further coupling. As the chain length of the growing oligomer increases, it becomes insoluble and deposits of the surface of the cell anode as a black film, where solid-state polymerization continues to occur. The term "polypyrrole" means polymers containing polymerized pyrrole rings including substituted pyrrole rings such as those represented by the following formula I:

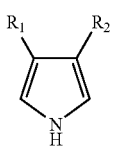

Formula I wherein $R_1$ and $R_2$ are each independently hydrogen or a lower alkyl group containing from 1 to about 7 carbon atoms. Examples of lower alkyl groups include methyl, ethyl, n-propyl, i-propyl, etc. In one preferred embodiment, $R_1$ and $R_2$ are independently methyl groups. Copolymers of pyrrole and N-methyl pyrrole or 3,4-dimethyl pyrrole can be used in the present invention. Alternatively, pyrrole or substituted pyrroles of the type represented by Formula (I) can be copolymerized with other copolymerizable monomers, and in particular, other heterocyclic ring compounds including those containing nitrogen such as pyridine, imidazole, etc., furan and thiophene, or with other aromatic or substituted aromatic compounds. Particularly preferred copolymers are pyrrole/furan and pyrrole/thiophene.

Polymers and copolymers of pyrrole are available commercially from a variety of sources or may be manufactured by techniques well known to those skilled in the art. For example, polymers of pyrrole can be obtained by electropolymerization as reported in U.K. Patent 2,184,738 and by Diaz et al, J. Chem. Soc., Chem. Comm., 635 (1979) and in J. Chem. Soc., Chem. Comm., 397 (1980). Polypyrrole is electrically conducting in the charged or oxidized state (black), and produced in this state by electropolymerization. If polypyrrole is completely reduced to the neutral or discharge state (yellow), it is an electronic insulator. Polypyrrole, and in particular, pyrrole black can be formed as a polymeric powdered material by oxidizing pyrrole in homogeneous solution (e.g., with hydrogen peroxide). Gardini in Adv. Heterocyl. Chem., 15, 67 (1973) describes such a process and product. Pyrrole can also be oxidized into a polypyrrole with other oxidizing agents such as ferric chloride. Porous electronically conducting compositions comprising an electropolymerized polypyrrole or a copolymer of a pyrrole useful in the present invention are described in U.K. 2,184,738, the disclosure of which is hereby incorporated by reference. Briefly, the process described therein comprises electropolymerization of a pyrrole or a copolymerizable mixture containing a pyrrole at an electronically conductive surface in an electrolytic bath by (A) immersing an electronically conductive surface in an electrolytic bath comprising (i) a pyrrole or a mixture of a pyrrole with a copolymerizable monomer, (ii) one or more low mobility anions which are incorporated into the polypyrrole or copolymer of pyrrole and which are characterized by an average ionic transference number for said low mobility anions during reduction of the polypyrrole or copolymer of less than about 0.1, and (iii) an organic diluent, and (B) passing an electric current through said bath at a voltage sufficient to electropolymerize the pyrrole or copolymerizable mixture containing pyrrole at the electronically conductive surface. The low mobility anions which are incorporated into the compositions may be either organic or inorganic ions. Examples of low mobility of inorganic ions described therein include transition metal complexes such as ferricyanide, nitroprusside, etc. Preferred low mobility anions are organic anions including those derived from organic sulfates or sulfonates which may be alkyl, cycloalkyl, aryl alkyl or alkaryl sulfates and sulfonates. The anions may contain more than one anionic site, i.e., more than one ionizable group per molecule, e.g., more than one sulfonic acid group per molecule. Examples of sulfonic acids include hexyl sulfonic acid, octyl sulfonic acid, dodecyl sulfonic acid, benzene sulfonic acid, toluene sulfonic acid, etc. Examples of sulfates include alkyl sulfates such as lauryl hydrogen sulfate and polyethylene hydrogen sulfates of various molecular weights.

The polyvinylpyridines which may be utilized as quench agent of the present invention include polymers of vinylpyridine and substituted vinylpyridine as well as copolymers with pyridine, substituted vinylpyridines, and/or other copolymerizable monomers such as acrylic esters, etc. The polymers and copolymers useful in the present invention may be derived from 2-vinylpyridine as well as 4-vinylpyridine. These polymers are commonly referred to in the art as P2VP for poly(2-vinylpyridine) and P4VP for poly(4-vinylpyridine). Polymers and copolymers of vinylpyridine are available commercially from such sources as Aldrich Chemical Company, Polyscience, etc.

Polymers of other heterocyclic nitrogen-containing compounds are also useful, and these include polyimidazoles and polyphenothiazines. Particularly useful are polymers of imidazole, 1-vinylimidazole, and phenothiazine.

Poly(pyrrole-co-furan) and Poly(pyrrole-co-thiophene)—The poly(pyrrole-cothiophene) contemplated for use in the present invention constitute repeat units of pyrrole attached to a thiophene ring. Likewise, poly(pyrrole-co-furan) constitute repeat units of a pyrrole attached to a furan ring. Thus copolymers, AB block polymers, mixed copolymer polymers are contemplated. Particularly preferred are repeat units where the thiophene or pyrrole is directly bonded to a pyrrole ring at the 2- and 2'-positions respectively and thus represented by the formula:

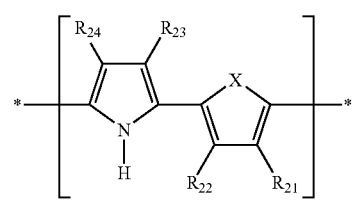

Formula III

Wherein X is oxygen or sulfur and each of $R_{21}$, $R_{22}$, $R_{23}$, and $R_{24}$ is independently selected from the group consisting of hydrogen, alkyl, aryl, alkaryl and aralkyl groups. In the present invention, for example when X is sulfur, a compound represented by the following formula is used as a monomer:

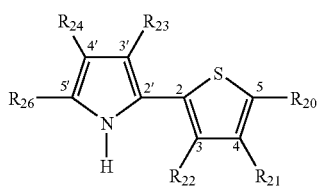

Formula IV wherein $R_{20}$ and $R_{26}$ represent hydrogen, carboxyl group or a salt thereof, preferably hydrogen, and $R_{21}$, $R_{22}$, $R_{23}$, and $R_{24}$ represent H, an alkyl, halogen, ether, aryl or aralkyl group. Similar monomers can be used when X is oxygen.

As these monomers, when X is sulfur for example, there can be mentioned 2,2'-thienylpyrrole, when $R_{20}$, $R_{21}$, $R_{22}$, $R_{23}$, $R_{24}$, and $R_{26}$ are H; 4-methyl-2,2'-thienylpyrrole or 4-ethyl-2,2'-thienylpyrrole, also preferred are 4'-methyl-2,2'-thienylpyrrole or 4'-ethyl-2,2'-thienylpyrrole, 4,4'-dimethyl-2,2'-thienylpyrrole or 4,4'-diethyl-2,2'-thienylpyrrole, 4-chloro-2,2'-thienylpyrrole, 4-bromo-2,2'-thienylpyrrole, 4-methoxy-2,2'-thienylpyrrole or 4-ethoxy 2,2'-thienylpyrrole, and 4-phenyl-2,2'-thienylpyrrole.

These compounds are easily available, but can also be obtained, for example, by the following process: a thenoylallylamide compound is converted into an imidoyl chloride derivative by the use of a suitable reagent such as phosgene or triphenylphosphine dichloride, and then 1,5-dipole cyclization reaction takes place by the treatment of a strong base such as t-butoxy potassium.

The poly(pyrrole-co-thiophene) copolymers and poly(pyrrole-co-furan) copolymer quenching agents of the present invention are mainly obtained by the electrolytic oxidation of the monomer described above in the presence of a supporting electrolyte and a solvent (having high dielectric constant).

The supporting electrolyte includes various compounds such as, for example, an organic quaternary ammonium salt, an inorganic salt, a protonic acid and an ester. As the organic quaternary ammonium salt, there can be mentioned, for example, tetraethylammonium tetrafluoroborate, tetra-n-butylammonium tetrafluoroborate, tetraethylammonium perchlorate, tetra-n-butyl-ammonium perchlorate, tetraethylammonium p-toluenesulfonate, tetra-n-butyl-ammonium p-toluenesulfonate, tetraethyl-ammonium hydrogensulfate, tetra-n-butyl-ammonium hydrogensulfate, tetraethylammonium hexafluorophosphate, tetra-n-butylammonium hexafluorophosphate, tetra-ethylammonium trifluoromethane-sulfonate and tetra-n-butyl-ammonium trifluoromethane-sulfonate. The inorganic salt includes lithium, sodium, barium and silver salts having the anion parts described above. As the protonic acid, sulfuric acid and nitric acid are mentioned. The foregoing supporting electrolyte and monomer are dissolved in a solvent such as water, acetonitrile, propylene carbonate, dimethyl sulfoxide, N-methylpyrrolidone, nitrobenzene, nitromethane N,N-dimethylacetamide, N,N-dimethylformamide, hexamethyl-phosphoramid, methylene chloride, pyridine and tetrahydrofuran in concentrations of 0.01M to 1M, respectively. In the solution thus obtained, the electric current is passed through electrodes of an electric conductive metal such as platinum, or conductive glass coated with an electric conductive metal oxide thereon, applying an interelectrode voltage of not more than 100V, preferably not more than 50V and a current density within the range of 0.01 to 10 $mA/cm^2$, whereby the polymer of the present invention can be obtained. When the electrolytic polymerization conditions, for example an interelectrode voltage and a current density, outside the ranges described above are applied, there can not be obtained the polymer which has the repeat structural units specified in the present invention and is structurally regular.

Preparations

Preparation A

Ferric chloride (373 parts, 2.3 moles) is dissolved in 3000 parts of distilled water in a 5-liter flask. Pyrrole (67.09 parts, 1 mole) is added dropwise to the flask over a period of about 45 minutes as the temperature of the mixture increases a maximum of 3° C. The mixture is stirred at room temperature for one day, allowed to stand for two days, filtered, and the residue is washed with distilled water until the filtrate is colorless. The residue is dried overnight in a steam oven and dried in a vacuum oven at 120°-125° C. The polypyrrole salt prepared in this manner contains 16.3% nitrogen and 10.59% chlorine.

Preparation B

A 3-liter flask is charged with 66 parts (1 mole) of aqueous ammonium hydroxide and 1940 parts of distilled water. The polypyrrole salt of Example A (100 parts) is added and the mixture is stirred at room temperature for one day. The reaction mixture is filtered, and the residue is slurried with 2000 parts of distilled water overnight. The slurry is filtered, and the residue is dried in a vacuum oven at 150° C. The powder obtained in this matter contains 19.0% nitrogen and 0.97% chlorine.

Preparation C

A 5-liter flask is charged with 491.7 parts (1.76 moles) of ferric chloride hexahydrate and 3700 parts of water. A solution of 8 parts (0.18 mole) of polyvinyl alcohol (Mw 25000) in 100 parts of water is prepared by heating to 75° C. with stirring for about 15 minutes. This solution also is added to the 5-liter flask. Pyrrole (50.8 parts, 0.75 mole) is added to the reaction flask over a period of about 15 minutes, and the black reaction mixture is stirred overnight. The mixture is then filtered, and the black residue thus obtained is slurried with 2500 parts of water, stirred for one hour and filtered. The residue is again slurried with 2000 parts of water, stirred for 3.5 hours and filtered. The residue is dried in a forced air oven at 55° C. for 6 hours and in a vacuum oven at 110° C. for 48 hours. A black solid is obtained which contains 15.4% nitrogen and 9.08% chlorine.

Preparation D

A polypyrrole lauryl sulfate is prepared in accordance with the general procedure described in U.K. Patent 2,184,738. In this procedure, 1200 grams (17.89 moles) of pyrrole, 1200 grams (4.16 moles) of sodium lauryl sulfate, 600 grams of polyethyleneoxide (molecular weight=20,000) and 15 gallons of water are mixed and electropolymerized using a 17 inch.times.36 inch.times.0.05 inch 10/10 steel anode cleaned with a fine wire brush. The anode is bussed along the 36 inch top dimension with two 1.5.times.36.times.0.1 inch copper strips using 5 bolts passing through the anode plate. The inner 3 bolts serve as the anode electrical connections. The electropolymerization is conducted at 100 amps for 120 minutes. The power is removed and the mixture is cooled to ambient temperature, washed with water and filtered. The residue is washed 3 times with water, ground in a Waring blender with water and filtered. The residue is washed with water and then methanol. The powder is vacuum dried at 75° C. overnight.

The dry powder obtained in this manner contains 62.31% carbon, 10.77% nitrogen, 5.33% sulfur and 0.010% sodium.

Preparation E

A 2-liter flask is charged with 196.7 parts (0.3 mole) of the polypyrrole lauryl sulfate prepared in Example D, and 900 parts of methanol are added to form a slurry. A solution of 20 parts of potassium hydroxide (0.357 mole) in 300 parts of water is prepared and added to the flask over a period of two hours with stirring. The mixture is stirred for several hours at room temperature and filtered. The residue is slurried and washed with 1000 parts of methanol, 1000 parts of aqueous methanol (50/50) and finally, two times with 1000 parts of methanol. The slurry is filtered, and the residue is air dried and dried in a steam oven. The product obtained in this manner contains 1.88% sulfur.

Preparation F

To a 5-liter flask there are added 214 parts (2 moles) of o-toluidine and 600 parts of concentrated hydrochloric acid (7.2 moles) in 1400 parts of water. The mixture is cooled to 6° C. and a solution of 0.28 part (0.001 mole) ferrous sulfate heptahydrate in 20 parts of water is added followed by a solution of 912 parts (4 moles) of ammonium persulfate in 200 parts of hydrochloric acid dissolved in 1800 parts of water precooled to 5° C. As this solution is added, the reaction temperature rises to about 22° C. The reaction mixture is maintained at about 20° C. by external cooling, and the persulfate addition is completed in about 3.5 hours. Stirring is continued overnight and the reaction mixture then is filtered. The residue is slurried with 2500 parts of water, stirred for about 5 hours and filtered. The residue thus obtained is slurried with 200 parts (3 moles) of ammonium hydroxide and 2000 parts of distilled water and stirred overnight. The mixture is again filtered, and the residue thus obtained is slurried with 2500 parts of water and stirred overnight. The mixture is filtered, and a black residue is obtained which is dried in a steam chest for about two days and finally in a vacuum oven at 140° C. for 24 hours. The solid obtained in this manner contains 8.55% nitrogen, 0.11% sulfur and 2.85% chlorine.

Preparation G

A 1-liter reaction flask is charged with 72 parts (1 mole) of acrylic acid and 700 parts of distilled water. To this mixture is added 100.7 parts (0.95 mole) of 4-vinylpyridine dropwise over 15 minutes. During this addition, the temperature rises from about 23° C. to about 36° C. When the addition of the 4 vinylpyridine is completed, the reaction mixture is heated and purged with nitrogen to a temperature of 60° C. whereupon a solution of one part of 2,2'-azobis(2-amidinopropane)dihydrochloride in 5 grams of water is added. The mixture is heated at about 60° C. with stirring for about two days, and the mixture is transferred to a pyrex glass dish and dried in a steam chest for 18 days and in a vacuum oven at 125° C. for 40 hours. A brown solid is obtained which contains 8.31% nitrogen.

Preparation H

A 1-liter reaction flask is charged with 55 parts (0.5 mole) of 4-vinylpyridine, 200 parts of distilled water and 200 parts of methanol. The mixture is stirred purging with nitrogen, is heated. At a temperature of 59° C., a solution of 0.2 part of 2,2'-azobis(2-amidinopropane)dihydrochloride in two parts of water is added. Stirring is continued for about 36 hours at a temperature of about 60° C. At this time, the mixture is cooled and allowed to stand overnight. A mixture of 62.4 parts (0.25 mole) of cuprous sulfate pentahydrate in 200 parts of water and 200 parts of methanol is prepared and added to the reaction flask. Stirring is continued for two days. The reaction mixture is transferred to a glass dish and dried in a steam chest for 8 days followed by drying in a vacuum oven at 125° C. for 24 hours. A brown solid is obtained which contains 7.33% nitrogen and 15.2% copper.

Preparation K

A 1-liter reaction flask is charged with 22.4 parts (0.213 mole) of poly(2-vinylpyridine) from Aldrich Chemical and 250 parts of water. A solution of 26.6 parts (0.106 mole) of cuprous sulfate pentahydrate in 150 parts of water is added over a period of five minutes. The mixture is stirred overnight at which time the reaction mixture is filtered. A green filtrate is obtained and transferred to a pyrex glass dish. The green filtrate is dried in a steam chest for 5 days and finally in a vacuum oven at 125° C. for 24 hours. A brown solid is obtained which contains 8.53% nitrogen and 9.2% copper.

EXAMPLES

The invention is further illustrated by the following examples, which are not to be considered as limitative of its scope. A further understanding of the invention can be had in the following nonlimiting Preparations and Examples. Wherein unless expressly stated in the contrary, all temperatures and temperatures ranges refer to the Centigrade system and the term "ambient" or "room temperature" refers to about 20 to 25° C. The term "percent or %" refers to weight percent. The term "equivalent" refers to a quantity of reagent equal in moles, to the moles of the preceding or succeeding reactant recited in that example in terms of finite moles or finite weight or volume.

Example 1

Preparation of Polyisobutylene Using a Mono-functional Initiator and Polypyrrole A four-neck 250 milliliter round-bottom flask was equipped with an overhead mechanical stirrer and platinum resistance thermometer. This assembly was immersed into a heptane bath at −60° C. under dry nitrogen gas in a substantially inert atmosphere glovebox. The flask was then charged with the following reactants: 108 milliliters hexane equilibrated at −60° C., 72 milliliters methylchloride equilibrated at −60° C., 0.48 milliliters 2-chloro-2,4,4-trimethylpentane equilibrated at room temperature, 0.23 milliliters 2,6-dimethylpyridine equilibrated at room temperature, 16.4 milliliters of isobutylene equilibrated at −60° C., and the contents of the round-bottom flask were equilibrated at −60° C. With continued stirring, next 1.82 milliliters titanium tetrachloride was charged to the flask. The reaction was allowed to proceed 12 minutes and then 20 milliliters of the polymerization solution was charged to nine 60 milliliter test tubes, equipped with threaded caps, immersed in the heptane bath.

The polymerization was allowed to continue in each test tube for 12 additional minutes (24 total reaction minutes) at which point 1 of the 9 tubes was terminated with 5 milliliters of methanol to provide a control example prior to addition of polypyrrole (Control 1). 2.094 g polypyrrole (20% wt. blend with carbon black, coated on titanium dioxide and purchased from Aldrich Chemical Co.) was added to one of the test tubes containing a reactive polymerization and 6 other quenchers were added to 6 or the remaining 7 tubes. The polypyrrole quenching reaction was allowed to proceed 30 minutes at which time 5 milliliters of methanol was charged in order to terminate the reaction. The final polymerization test tube was then terminated with 5 milliliters of methanol to provide a final control example (Control 2). The control examples were used to provide a baseline for the quenching reactions and to provide references for structural and molecular weight characterization in the absence of a quenching agent.

Comparative Example A

Preparation of Polyisobutylene Using a Mono-functional Initiator and Pyrrole

Polyisobutylene was prepared according to the procedure described in Example 1. Comparative example A conditions were similar to Example 1 conditions except that the total reaction volume was 40 milliliters, the quenching agent concentration was 0.015 M, the temperature was −70° C. and 0.04 g pyrrole was substituted for polypyrrole.

Comparative Example B

Preparation of Polyisobutylene Using a Mono-functional Initiator and N-methylpyrrole Polyisobutylene was prepared according to the procedure described in Example 1. Comparative example B conditions were similar to Example 1 conditions except that the total reaction volume was 40 milliliters, the quenching agent concentration was 0.015 M, the temperature was −70° C. and 0.049 g N-methylpyrrole was substituted for polypyrrole.

The results of Comparative Examples A and B are listed in Table 1. The results indicate that neither pyrrole itself, nor N-methylpyrrole yield polyisobutylene containing olefin end groups.

Procedure for Collecting $^1$H NMR Data $^1$H NMR spectra were collected using a Varian (300 MHz) spectrophotometer using samples concentrations of 3 percent to 5 percent (weight/weight) in $CDCl_3$. $^1$H NMR spectra were used for analysis of the end groups. Fractions of exo-olefin, endo-olefin, tert-chloride and coupled olefin chain ends were obtained using $^1$H NMR integration as described in a subsequent section.

Procedure for Collecting GPC Data

GPC data were used to determine number average molecular weight ($M_n$), weight average molecular weight ($M_w$) and Polydispersity index (PDI), i.e., $M_w/M_n$. GPC was also used to qualitatively detect olefin coupled product.

Procedure for Calculating the Fractional Amounts of Chain Ends on the Polyisobutylene Product The fractions of exo-olefin, endo-olefin, and tert-chloride chain ends, and EAS, di-EAS, and coupled products in the polyisobutylene samples were quantified using $^1$H NMR integration. It was assumed that these six species represent 100 percent of the chain ends. In some instances, EAS, di-EAS, and coupled products were deemed to be absent by qualitative inspection of the $^1$H NMR spectrum, and for di-EAS and coupled products, by confirming the absence of a shoulder on the low elution volume side of the main polymer peak in the GPC chromatogram. Two procedures are given below. The "General Procedure" was used when coupled product was detected; the "Special Procedure" was used when coupled product was deemed to be absent.

General Procedure

The fractional molar amount of each type of chain end was obtained using an equation analogous to the equation given below for determining the fractional amount of exo-olefin, $$F(exo) = (A_{exo})/(A_{exo} + A_{endo} + A_{tert-Cl} + A_{EAS} + 2A_{di-EAS} + 2A_{coupled}) \quad (1)$$

where $A_{endo}$ is the area of the single olefinic resonance at 5.15 ppm, $A_{exo}$ is the area of the exo-olefinic resonance 4.63 ppm, and $A_{tert-Cl}$ was calculated as follows:

$$A_{tert-Cl} = (A_{1.65-1.72}/6) - A_{endo} \quad (2)$$

where $A_{1.65-1.72}$ is the integrated area of the convoluted peaks associated with the gem-dimethyl protons of the endo-olefin and the tert-chloride chain ends. The integrated area of EAS or di-EAS product, when present, was evaluated on a situation-by-situation basis; the integration was determined based on a peak that is not convoluted by other peaks, and the area was normalized based on the number of protons that have that characteristic peak. It will be noted that a co-efficient of 2 appears in equation (1) for both di-EAS and coupled product, to account for the fact that creation of either of these products consumes 2 polyisobutylene chains. $A_{coupled}$ was calculated as follows:

$$A_{coupled} = (A_{5.0-4.75} - A_{4.5-4.75})/2 \quad (3)$$

where $A_{5.04-4.75}$ is the integrated area of the convoluted peaks associated with one of the exo-olefin protons and the two identical protons of the coupled product, and where $A_{4.5-4.75}$ is the integrated area of the peak associated with the other exo-olefin proton.

Special Procedure

In the qualitative absence of coupled product, the fractional molar amount of each type of chain end was obtained using an equation analogous to the equation given below for determining the fractional amount of exo-olefin, $$F(exo) = (A_{exo})/(A_{exo} + A_{endo} + A_{tert-Cl} + A_{EAS} + 2A_{di-EAS}) \quad (1)$$

where $A_{endo}$ is the area of the single olefinic resonance at 5.15 ppm, $A_{exo}$ is the average area of the two exo-olefinic resonances at 4.63 and 4.85 parts per million, and $A_{tert-Cl}$, $A_{EAS}$, and $A_{di-EAS}$ were calculated in the same manner as described in the "General Procedure".

The $^1$H NMR results obtained on the polyisobutylene samples prepared in Example 1 and Comparative Examples A and B above are given below in Table I as the mole percent of the total end groups.

TABLE 1

| Examples | Quenching Agent | Exo-Olefin Chain End (mole %) | Endo-Olefin Chain End (mole %) | Tert-Cl Chain End (mole %) | EAS Chain End (mole %) | Di-EAS Chain End (mole %) | Coupled Product (mole %) | Reaction Temp. (° C.) |
|---|---|---|---|---|---|---|---|---|
| 1 | Polypyrrole | 40 | <1 | 54 | 0 | 0 | <1 | −60 |
| Control 1 | None; (Prequench) | 9 | <1 | 91 | 0 | 0 | <1 | −60 |

TABLE 1-continued

| Examples | Quenching Agent | Exo-Olefin Chain End (mole %) | Endo-Olefin Chain End (mole %) | Tert-Cl Chain End (mole %) | EAS Chain End (mole %) | Di-EAS Chain End (mole %) | Coupled Product (mole %) | Reaction Temp. (° C.) |
|---|---|---|---|---|---|---|---|---|
| Control 2 | None; (Postquench) | 9 | <1 | 91 | 0 | 0 | <1 | −60 |
| Comparative A | Pyrrole | 0 | 0 | <1 | 33 | 66 | 0 | −70 |
| Comparative B | N-methylpyrrole | 0 | 0 | <1 | 99 | <1 | 0 | −70 |

The results, shown in Table I, indicate that polypyrrole quenching produced exo-olefin at −60° C. without detectable coupling. As seen by Control 1, prior to addition of a quenching agent, there was minimal exo-olefin chain ends and a large mole percentage as the tert-chloride chain end. Control 2 demonstrates that exo-olefin content of the polymer is unaffected by the post quench and post reaction steps and conditions. Thus, it is apparent that the exo-olefin of a polymer can be enriched in vinylidene end groups by selecting a quasiliving carbocationically terminated polyolefin polymer and contacting the quasiliving carbocationically terminated polyolefin polymer with a suitable quenching agent.

Furthermore, the results of Comparative Examples A and B are listed in Table 1. The results indicate that neither pyrrole itself, nor N-methylpyrrole yield polyisobutylene containing olefin end groups.

What is claimed is:

1. A method for producing a vinylidene terminated polymer comprising:
   a. providing a quasiliving carbocationically terminated polyolefin polymer,
   b. contacting the polymer in step a) with at least one quenching agent selected from the group consisting of polypyrrole, poly(2-vinylpyridine), polyphenothiazine, polyoxazine, poly(pyrrole-co-furan) and poly(pyrrole-co-thiophene) and substituted derivatives thereof;
   wherein a vinylidene terminated polymer is formed.

2. The method of claim 1, wherein the quasiliving carbocationically terminated polymer is formed by contacting at least one cationically polymerizable olefin monomer with an initiator, in the presence of a Lewis acid and solvent under quasiliving polymerization reaction conditions.

3. The method of claim 2, wherein the initiator is monofunctional.

4. The method of claim 3, wherein the initiator is selected from the group consisting of 2-chloro-2-phenylpropane; 2-acetyl-2-phenylpropane; 2-propionyl-2-phenylpropane, 2-methoxy-2-phenylpropane, 2-ethoxy-2-phenylpropane, 2-chloro-2,4,4-trimethylpentane, 2-acetyl-2,4,4,-trimethylpentane, 2-propionyl-2,4,4-trimethylpentane, 2-methoxy-2,4,4-trimethylpentane, and 2-ethoxy-2,4,4-trimethylpentane.

5. The method of claim 4, wherein the initiator is 2-chloro-2,4,4-trimethylpentane.

6. The method of claim 2, wherein the initiator is bifunctional.

7. The method of claim 6, wherein the initiator is selected from the group consisting of 1,3-di(2-chloro-2-propyl)benzene, 1,3-di(2-methoxy-2-propyl)benzene, 1,4-di(2-chloro-2-propyl)benzene, 1,4-di(2-methoxy-2-propyl)benzene, and 5-tert-butyl-1,3,-di(2-chloro-2-propyl)benzene.

8. The method of claim 7, wherein the initiator is 5-tert-butyl-1,3,-di(2-chloro-2-propyl)benzene.

9. The method of claim 2, wherein the initiator is multifunctional.

10. The method of claim 9, wherein the initiator is selected from the group consisting 1,3,5-tri(2-chloro-2-propyl)benzene and 1,3,5-tri(2-methoxy-2-propyl)benzene.

11. The method of claim 2, wherein the at least one cationically polymerizable olefin monomer is selected from the group consisting of isobutene, 2-methyl-1-butene, 3-methyl-1-butene, and 4-methyl-1-pentene.

12. The method of claim 11, wherein the at least one cationically polymerizable olefin monomer is isobutylene.

13. The method of claim 2, wherein two different cationically polymerizable olefin monomers are employed.

14. The method of claim 2, wherein the Lewis acid is selected from the group consisting of titanium tetrahalide, boron trihalide aluminum trichloride, tin tetrachloride, zinc chloride, and ethyl aluminum dichloride.

15. The method of claim 14, wherein the Lewis acid is selected from the group consisting of titanium tetrachloride, titanium tetrabromide, and boron trichloride.

16. The method of claim 15, wherein the Lewis acid is titanium tetrachloride.

17. The method of claim 2, wherein the quasiliving polymerization reaction conditions are selected to have a temperature range from between about −130° C. and +10° C.

18. The method of claim 17, wherein the quasiliving polymerization reaction conditions are selected to have a temperature range between about −70° C. and −10° C.

19. The method of claim 18, wherein the quasiliving polymerization reaction conditions are selected to have a temperature range between −60° C. and −20° C.

20. The method of claim 1, wherein the quasiliving carbocationically terminated polyolefin polymer is formed by ionizing a polyolefin chain end in the presence of a Lewis acid and a solvent under quasiliving polymerization reaction conditions.

21. The method of claim 20, wherein the quasiliving carbocationically terminated polyolefin polymer is formed by ionizing a polyolefin containing tert-halide chain ends in the presence of a Lewis acid and a solvent under quasiliving polymerization reaction conditions.

22. The method of claim 20, wherein the quasiliving carbocationically terminated polyolefin polymer is formed by ionizing a polyolefin containing tert-chloride chain ends in the presence of a Lewis acid and a solvent under quasiliving polymerization reaction conditions.

23. The method of claim 1, wherein the quenching agent in step b) is selected from the group consisting of polypyrrole, polyvinylpyridine, poly(pyrrole-co-thiophene) and poly(pyrrole-co-furan).

24. The method of claim 23, wherein the quenching agent in step b) is selected from the group consisting of polypyrrole, poly(pyrrole-co-thiophene) and poly(pyrrole-co-furan).

25. The method of claim 1, wherein the quenching agent in step b) is polypyrrole or substituted polypyrrole.

26. The method of claim 1, wherein the quenching agent-in step b) is a copolymer.

27. The method of claim 1, wherein in the contacting step, the quenching agent in step b) is selected so that it is solid phase.

28. The method of claim 27, wherein the contacting step is performed in a fixed bed reactor or a fluidized bed reactor.

29. The method of claim 2, wherein the quenching agent in step b) is insoluble in the solvent.

30. The method of claim 1, wherein the vinylidene terminated polymer has a molecular weight distribution, $M_w/M_n$, from about 1.01 to about 3.0.

31. The method of claim 30, wherein the molecular weight distribution, $M_w/M_n$, from about 1.1 to about 2.0.

32. The method of claim 31, wherein the molecular weight distribution, $M_w/M_n$, is less than 1.5.

* * * * *

UNITED STATES PATENT AND TRADEMARK OFFICE
CERTIFICATE OF CORRECTION

| | | |
|---|---|---|
| PATENT NO. | : 7,816,459 B2 | Page 1 of 1 |
| APPLICATION NO. | : 11/356490 | |
| DATED | : October 19, 2010 | |
| INVENTOR(S) | : Stokes | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1034 days.

Signed and Sealed this
Nineteenth Day of July, 2011

David J. Kappos
*Director of the United States Patent and Trademark Office*